United States Patent
Telle

[11] 3,958,842
[45] May 25, 1976

[54] RADIAL MAGNETIC BEARING

[75] Inventor: George R. Telle, El Segundo, Calif.

[73] Assignee: Hughes Aircraft Company, Culver City, Calif.

[22] Filed: Feb. 3, 1975

[21] Appl. No.: 546,485

[52] U.S. Cl. ............................................. 308/10
[51] Int. Cl.² ..................................... F16C 39/00
[58] Field of Search ................................... 308/10

[56] References Cited
UNITED STATES PATENTS

| | | | |
|---|---|---|---|
| 2,340,122 | 1/1944 | Hansen | 308/10 |
| 2,436,939 | 3/1948 | Schug | 308/10 |
| 3,493,274 | 2/1970 | Emslie | 308/10 |
| 3,614,181 | 10/1971 | Meeks | 308/10 |
| 3,698,775 | 10/1972 | Gilbert | 308/10 |

*Primary Examiner*—R. Skudy
*Attorney, Agent, or Firm*—Lewis B. Sternfels; W. H. MacAllister

[57] ABSTRACT

Triangularly shaped iron rings are alternated with axially magnetized rings on both a rotor and a stator in which like poles on and between the rotor and stator face one another to smooth out nonuniformity of individual magnetic flux distributions, to provide repulsion between the stator and the rotor, to minimize energy losses due to rotor rotation, to minimize the exposed high permeability surface for back leakage flux, to maximize the flux collection effectiveness of the iron rings, to fill the entire volume with a useful material, and to distribute the iron volume so that it has a uniformly high flux density throughout.

10 Claims, 2 Drawing Figures

Fig. 1.
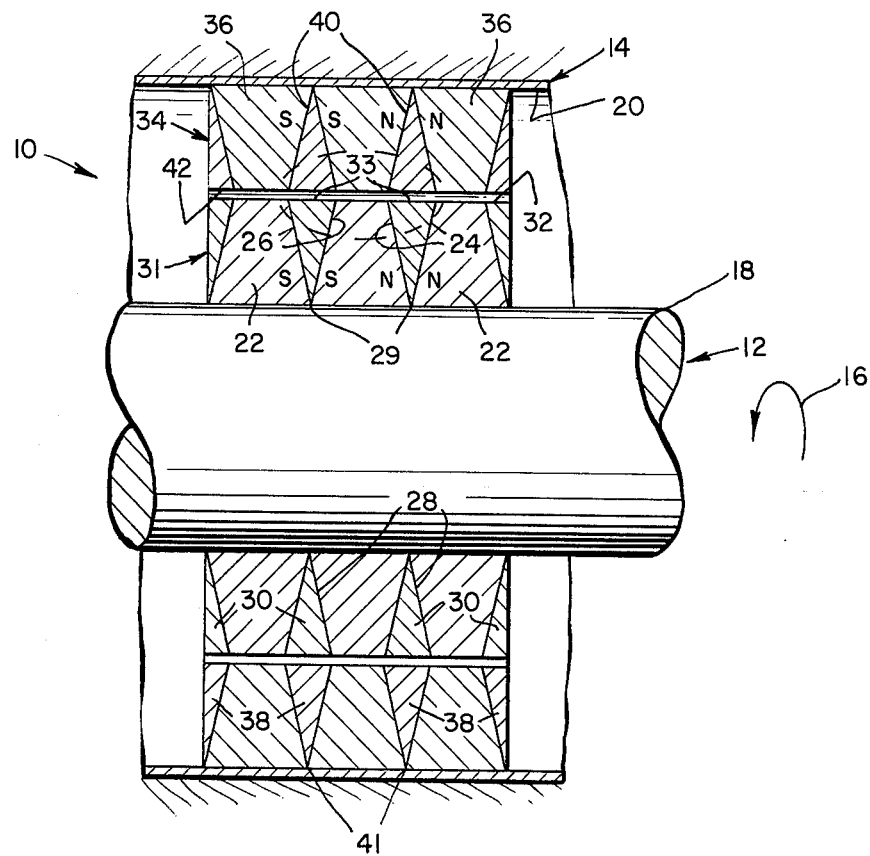
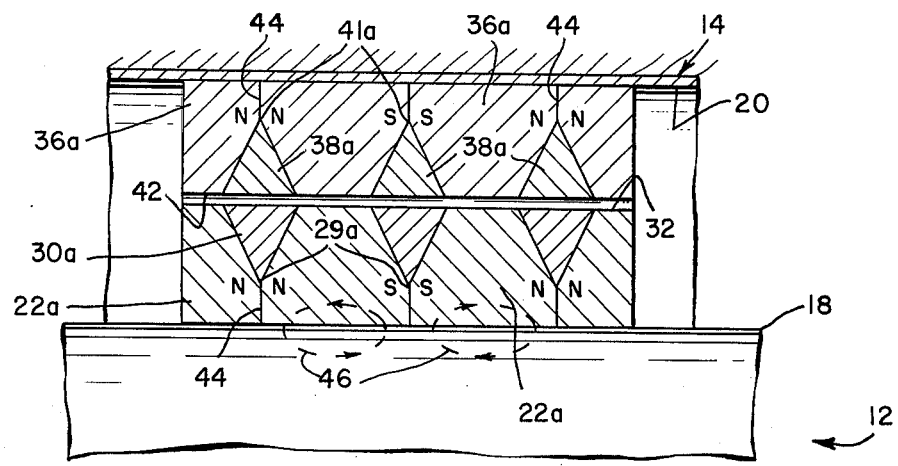
Fig. 2.

RADIAL MAGNETIC BEARING

BACKGROUND OF THE INVENTION

1. Field of the Invention

The present invention relates to magnetic bearing suspensions for relatively rotatable elements.

2. Description of the Prior Art

Magnetic bearing suspensions have been devised using various configurations of permanent magnets and electromagnets to provide stable suspension of rotating shafts or other devices, see, for example, "A Magnetic Journal Bearing", by F. T. Backers, Phillips Technical Review, Vol. 22, No. 7, 1960/61. Such a device comprises a plurality of permanent magnet discs which are radially polarized, thereby resulting in problems due to its radial repulsion design. First, the radially magnetized rings are very difficult to manufacture, especially in small sizes required for weight-effective designs. Second, local nonuniformity of magnetic strength produces flux variations and resulting eddy current and hysteresis losses when the suspended shaft is rotated, thereby resulting in large undesirable "friction" drag torques.

Another system utilizing axial attraction is disclosed in U.S. Pat. No. 23 2,340,122 to Hansen, Jr. That patent describes a magnetic bearing utilizing iron pole pieces of triangular cross-section, placed between axially polarized permanent magnets, thereby providing an arrangement for an axial attraction magnetic bearing. Such a bearing is radially unstable because poles of opposite polarity are adjacent the two members. The triangularity of the iron pole pieces are used to assist in turning and in the concentration of the fluxes and the iron poles are magnetically saturated to avoid an undesirable tangential path for fluxes.

SUMMARY OF THE INVENTION

The present invention overcomes these and other problems of the prior art by providing triangular iron rings which are alternated with axially magnetized rings on relatively rotatable elements to produce a flux field in the air gap equivalent to that produced by radially magnetized magnets. The iron rings are designed to have a high permeability to permit the flux to be evenly distributed between the magnets and the air gap, thereby producing a uniform field in the air gap despite any non-uniformity in the magnet wafers. As a result, spin drag torques due to non-uniform magnetization are therefore reduced to a near zero value. Because higher flux densities are achievable in soft iron materials than in permanent magnets, a more intense field in the air gap and more weight-effective designs can be used than previously obtained.

The triangular cross-section of the iron rings minimizes the exposed high permeability surface for back leakage flux, maximizes the flux collection effectiveness of the iron rings, fills the entire volume of the ring magnet-iron ring structure with useful material, and distributes the iron volume so that it has a uniformly high flux density throughout. As utilized herein, "back leakage flux" is defined as flux in the region radially outside and inside of the magnet-iron ring structure.

By utilizing radial repulsion, the invention becomes axially unstable, as distinguished from the above noted patent which is radially unstable. Furthermore, the present invention intentionally avoids saturation of the iron pole pieces by an appropriately wide base thereof to provide a tangential flux path to nullify the effects of non-uniform magnetization of the permanent magnets.

It is, therefore, an object of the present invention to provide a novel form of magnet bearing suspension.

Another object is to permit redistribution of flux between the magnets and in the air gap between relatively rotatable elements.

Another object is to produce uniform flux fields in the air gap despite non-uniformity in the magnetic wafers.

Another object is to achieve high flux densities in soft iron materials which are greater than those in permanent magnets.

Another object is to provide the capability of using more intense fields in the air gap and more weight-effective designs than previously obtainable.

Another object is to minimize flux loss through back leakage.

Another object is to maximize the flux collection effectiveness of the iron rings.

Another object is to maximize filling of the entire volume of the bearing with useful materials.

Another object is to distribute the iron volume so that it has a uniformly high flux density throughout.

Other aims and objects as well as a more complete understanding of the present invention will appear from the following explanation of an exemplary embodiment and the accompanying drawing thereof.

BRIEF DESCRIPTION OF THE DRAWING

FIG. 1 depicts a preferred embodiment of the present invention; and

FIG. 2 illustrates the upper half of a modification of the embodiment shown in FIG. 1.

DESCRIPTION OF THE PREFERRED EMBODIMENT

As shown in FIG. 1, a radial magnetic bearing 10 comprises a shaft 12 and a housing 14 which are positioned so as to enable relative rotation therebetween. As configured, shaft 12 is shown to be a rotor as indicated by arrow 16 with housing 14 acting as a stator. It is to be understood, however, that shaft 12 may be made stationary with respect to housing 14, if the particular use of the present invention requires such configuration.

Regardless of the particular end use, shaft 12 is provided with a circumferential surface 18 and housing 14 is provided with an inner cylindrical surface 20 which is substantially centered about and spaced from surface 18. A first plurality of axially magnetized ring magnets 22 are secured to shaft 12 at surface 18 in any convenient manner. Each of magnets 22 is of substantial ring shape and is axially magnetized to define pole faces 24 and 26 which are placed in such a fashion that like poles, e.g. south "S" poles 26 face one another and north "N" poles 24 face one another. Furthermore, pole faces 24 and 26 of adjacent magnets are sloped away from one another for defining V-shaped openings 28 whose apices 29 lie substantially on circumferential surface 18.

Within these V-shaped openings 28 are placed triangularly shaped ferro-magnetic rings 30, which are bonded or otherwise secured in any convenient manner to pole faces 24 and 26, to form a ring magnet-iron ring structure 31. It is important, in the practice of the present invention, that ferro-magnetic rings 30 are unsaturated by the magnetic field of magnets 22 in order to smooth out any non-uniform magnetic characteristics of the magnets. Such avoidance of saturation is obtained by providing a sufficient and appropriate width of the bases 33 of rings 30. Futhermore, the V-shaped configuration of openings 28 and the triangularly shaped rings 30 minimize back leakage flux loss at circumferential surface 18, thereby providing maximized flux concentration at surface 32 facing inner cylindrical surface 20 of housing 14 and the ring magnet-iron ring structure 34 secured thereto.

This structure 34 comprises a plurality of ring magnets 36 and ferro-magnetic rings 38 which have a configuration similar to that of magnets 22 and rings 30 of shaft structure 31. Specifically, south S poles face one another and north N poles face one another, with the faces of poles of adjacent magnets 36 defining V-shaped openings 40 whose apices 41 converges substantially on inner cylindrical surface 20 with the same purpose of minimizing back leakage loss at surface 20 and for maximizing flux at surface 42 facing surface 32 of shaft ring magnet-iron ring structure 31.

For both structures 31 and 34, back leakage flux, that is, flux which is wasted, is minimized. As used herein, back leakage flux is defined as flux in the region outside the outer diameter of housing 14 and flux in the region inside the inner diameter of shaft 12.

Also, surfaces 32 and 42 are aligned axially so that like poles on the housing and the shaft face each other, in order to provide radial repulsion forces between the hosuing and the shaft.

Facing surfaces 32 and 42 are slightly spaced from one another to enable relative rotation between shaft 12 and housing 14 and to permit the radial repulsion between the two structures 31 and 34 to support shaft 12 within housing 14 or, conversely, housing 14 about shaft 12.

Although a particular number of iron rings 30 and 38 and ring magnets 22 and 36 are illustrated, it is to be understood that any number of iron rings and ring magnets may be axially stacked up. In general, the larger the number of iron rings and ring magnets, the better the radial repulsion and bearing support. Furthermore, it is to be understood that the ends of the ring magnet-iron ring structure may comprise ring magnets, as shown in FIG. 2; however, it is preferred that the ends be iron rings as affording better shielding to avoid a large external magnetic field.

It is to be further understood that the apices of iron rings 30 and 38 of FIG. 1, rather than extending substantially to surfaces 18 and 20, may lie within the region of the ring magnets. Specifically as shown in FIG. 2, iron rings 30a and 38a between ring magnets 22a and 36a are so constructed that their apices 29a and 41a do not touch respective surfaces 18 and 20. The additional magnet material, extending radially beyond apices 29a and 41a, supplies the back leakage flux without depleting the flux of the portion of the magnets between the iron rings. Furthermore, the high permeability iron is removed from the back leakage flux path 46.

While iron rings 30 and 38, and 30a and 38a, have been illustrated as being triangular, it is to be understood that any configuration which permits the iron rings to increase in axial dimension from shaft and housing surfaces 18 and 29 towards the air gap between surfaces 32 and 42 are contemplated as being within the concepts of the present invention. Such configurations include trapezoidal cross-sections, triangles and trapezoids modified by curving the sides thereof or by using sides of two or more differently angled straight and/or curved line segments. Accordingly, the cross-sectional configuration of iron rings 30, 30a and 38, 38a is termed "substantially triangular".

Although the invention has been described with reference to a particular embodiment thereof, it should be realized that various changes and modifications may be made therein without departing from the spirit and scope of the invention.

What is claimed is:

1. A radial magnetic bearing comprising:
   a shaft having a circumferential surface and a housing having an inner cylindrical surface substantially centered about and spaced from said circumferential surface;
   a first plurality of axially magnetized ring magnets secured to said circumferential surface of said shaft and being axially terminated in faces for defining magnetic poles, in which like poles of adjacent ones of said magnets face one another, said like pole faces of said adjacent magnets being sloped away from one another for defining means for defining a configuration of substantially triangular openings converging substantially at said circumferential surface;
   a first plurality of substantially triangularly-shaped ferro-magnetic rings positioned in said triangular openings means and secured to said sloped pole faces, in which said ferro-magnetic rings have bases of sufficient width for preventing saturation thereof, for providing a flux path tangential to said circumferential surface for thereby smoothing out any non-uniform magnetization of said magnets, and for minimizing back leakage flux at said circumferential surface;
   a second plurality of axially magnetized ring magnets secured to said inner cylindrical surface of said housing and being axially terminated in faces for defining magnetic poles, in which like poles of adjacent ones of said magnets face one another, said like pole faces of said adjacent magnets being sloped away from one another for defining means for defining a configuration of substantially triangular openings converging substantially at said inner cylindrical surface, said like poles of said second plurality of axially magnetized ring magnets being radially aligned with said like poles of said first plurality of axially magnetized ring magnets for radially repelling said first and second plurality of magnets from one another and thereby for centering of said shaft with respect to said housing; and
   a second plurality of triangularly-shaped ferro-magnetic rings positioned in said triangular openings means of said second plurality of magnets and secured to said sloped pole faces thereof, in which said ferro-magnetic rings have bases of sufficient width for preventing saturation thereof, for providing a flux path tangential to said inner cylindrical surface for thereby smoothing out any non-uniform magnetization of said second plurality of said magnets, and for minimizing back leakage flux loss at said inner cylindrical surface.

2. A bearing as in claim 1 wherein said shaft comprises a rotatable element and said housing comprises an element fixed with respect to said shaft.

3. A radial magnetic bearing comprising:

first means having affixed thereto structure for defining a plurality of axially alternating axially magnetized ring magnets and ferro-magnetic rings secured to one another; and second means having affixed thereto structure for defining a plurality of axially alternating axially magnetized ring magnets and ferro-magnetic rings secured to one another, said second means magnets and ferro-magnetic rings facing said first means magnets and ferro-magnetic rings and having means therebetween for defining a space and for centering of said first means with respect to said second means by radial repulsion between said first means structure and said second means structure; both said structures of said first and second means each comprising substantially triangular shapes of said ferro-magnetic rings, and both said structures having means for defining bases of sufficient widths for providing unsaturation of said ferro-magnetic rings, for minimizing exposed high permeability surfaces of both said structures for back leakage flux, for maximizing flux collection effectiveness of said ferro-magnetic rings, and for smoothing any non-uniform magnetic fields of said ring magneto.

4. The radial magnetic bearing of claim 3 wherein like poles of said ring magnets in each of said structures and in said facing structures are placed substantially opposite one another for providing the radial repulsion.

5. The radial magnetic bearing of claim 3 wherein said ring magnets have inner and outer radial surfaces and wherein said triangularly shaped ferro-magnetic rings of both said structures have apices and said bases extending substantially flush with said inner and outer ring magnet surfaces.

6. The radial magnetic bearing of claim 3 wherein said ring magnets have inner and outer radial surfaces and wherein said triangularly shaped ferro-magnetic rings of both said structures have said bases extending substantially flush with said ring magnet inner and outer surfaces and have apices contained within said ring magnet inner and outer surfaces for providing additional material of said ring magnets beyond said apices and for supplying back leakage flux without depleting any flux of portions of said ring magnets contacting said ferro-magnetic rings and for removing said ferro-magnetic rings from the path of the back leakage flux.

7. The radial magnetic bearing of claim 3 wherein each of said first and second means structures terminate in said ferro-magnetic rings for providing a shielding for avoiding large magnetic fields external to said structures.

8. The radial magnetic bearing of claim 3 wherein each of said first and second means structures terminate in said ring magnets.

9. The radial magnetic bearing of claim 3 wherein said substantially triangular shapes of said ferro-magnetic rings comprise cross-sections uniformly increasing in axial dimension towards said space means between said first and second means structures.

10. The radial magnetic bearing of claim 3 wherein said substantially triangular shapes of said ferro-magnetic rings comprise cross-sections non-uniformly increasing in axial dimension towards said space means between said first and second means structures.

* * * * *